Patented Sept. 8, 1925.

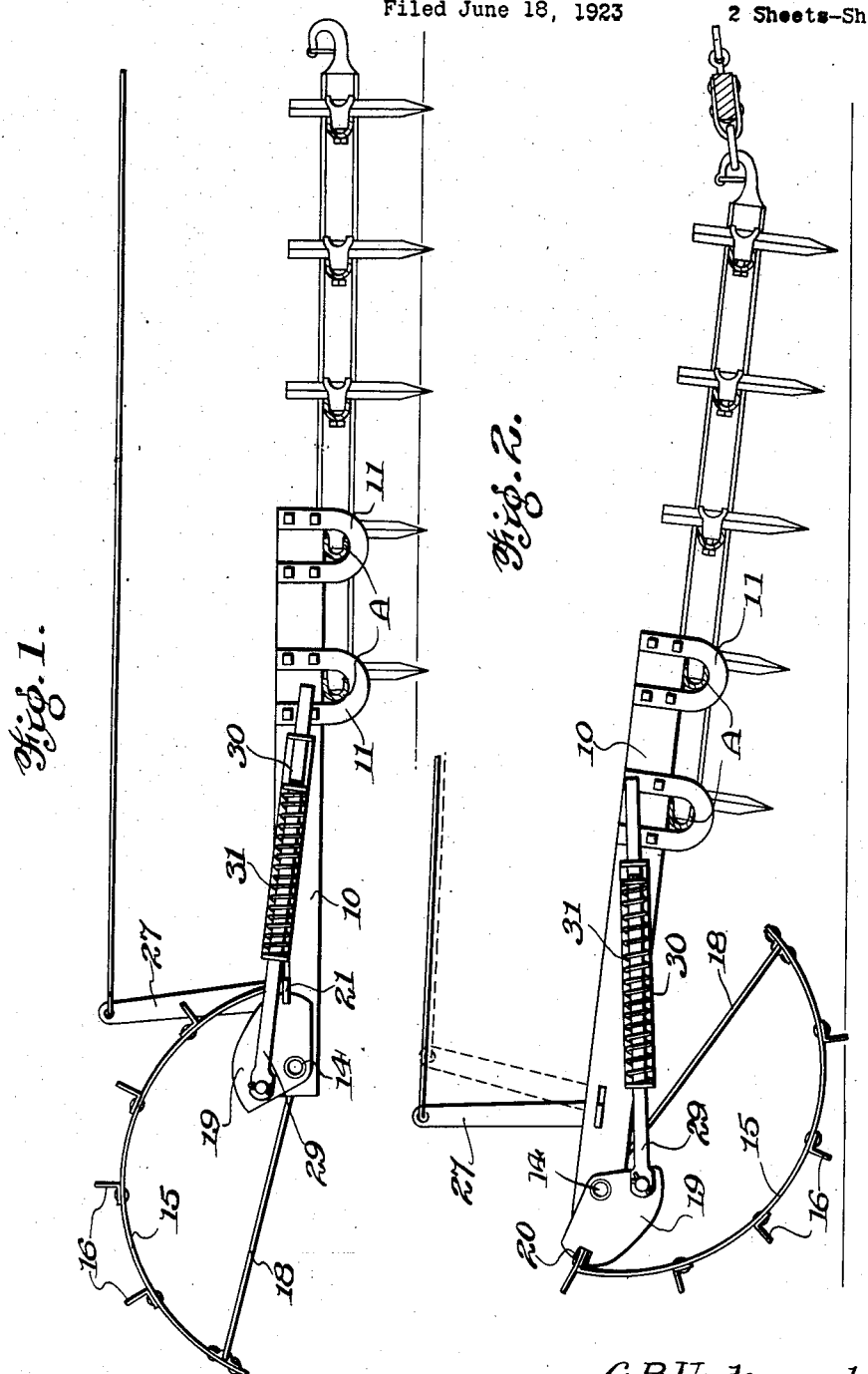

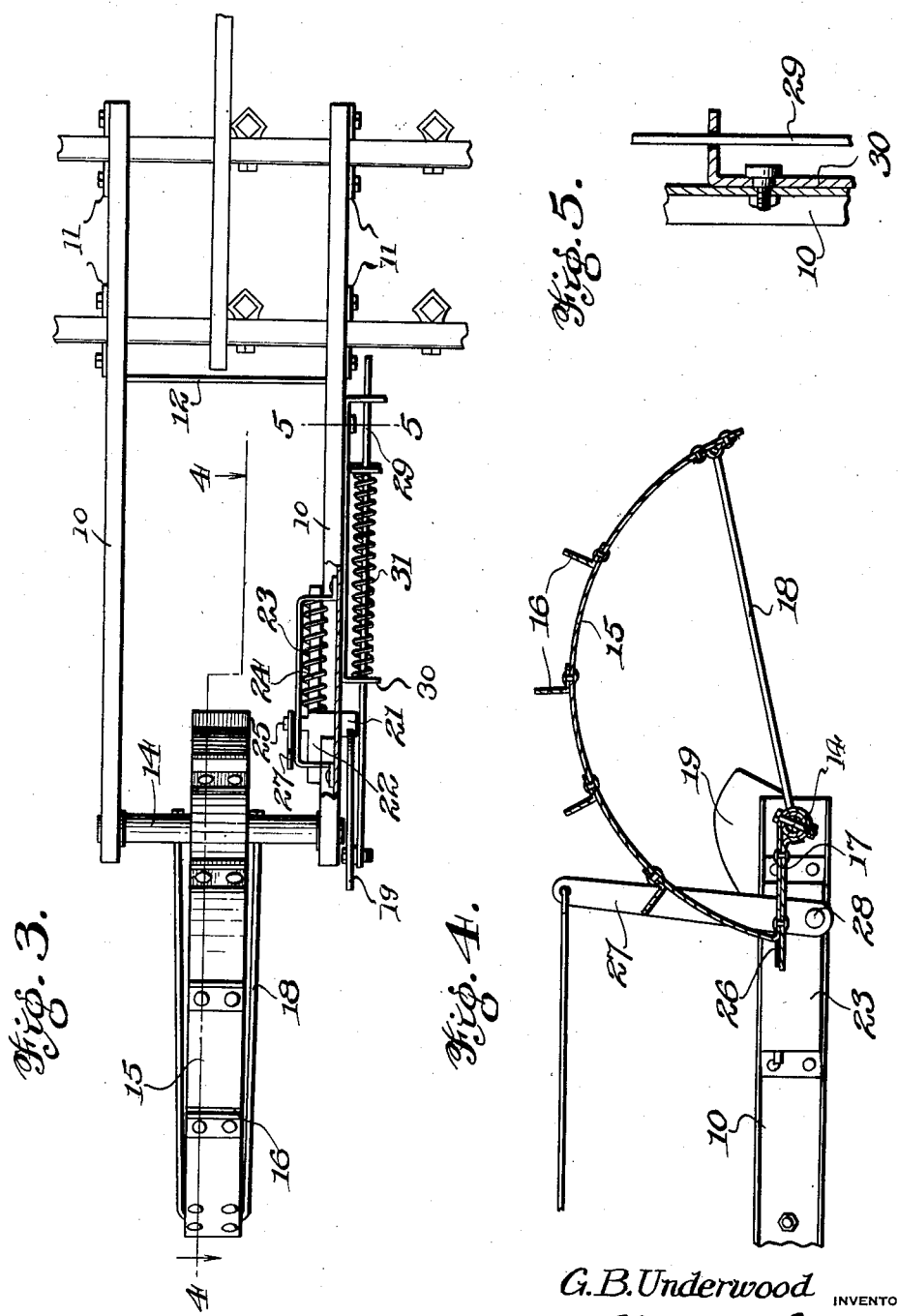

1,553,273

UNITED STATES PATENT OFFICE.

GEORGE B. UNDERWOOD, OF LOVING, TEXAS.

CLEARING ATTACHMENT FOR HARROWS.

Application filed June 18, 1923. Serial No. 646,164.

*To all whom it may concern:*

Be it known that I, GEORGE B. UNDERWOOD, a citizen of the United States, residing at Loving, in the county of Young and State of Texas, have invented new and useful Improvements in Clearing Attachments for Harrows, of which the following is a specification.

This invention contemplates the provision of a harrow attachment to facilitate dumping or cleaning of the harrow from time to time when the same is in use.

In certain harrows, the teeth become clogged with trash which must from time to time be removed in order that the harrow can perform its function properly, and at present it is necessary to lift the harrows from the ground for this purpose. When the harrow is attached to a tractor or the like, the operator must of necessity leave his seat to elevate the harrow for the purpose above mentioned which in addition to being troublesome and laborious results in a loss of time.

It is therefore the object of the present invention to provide an attachment which is automatic in its operation for the purpose of elevating the harrow from the ground so that it can be cleaned or dumped, the attachment being released by means of a lever which is arranged within convenient reach of the operator.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the attachment showing it associated with a harrow.

Figure 2 is a view showing the manner of using the attachment with the harrow elevated from the ground.

Figure 3 is a top plan view of the invention.

Figure 4 is a sectional view taken on the line 4—4 of Figure 3, and

Figure 5 is a fragmentary detail view of parts of the invention.

The attachment forming the subject matter of the present invention embodies a frame including spaced parallel members 10 which support lugs 11 designed to accommodate themselves to the adjacent beams A of the harrow as clearly illustrated in the drawings. The side members 10 are connected together by cross members 12 which of course affords the frame proper strength and rigidity. Journalled between the members 10 of the frame is an axle or shaft 14 which has mounted thereon an arcuate shaped shoe 15 from the exterior side of which projects a series of lugs 16. One end of this shoe is connected to the axle 14 by means of a bracket or clamp 17 while the other end is attached to the axle by means of brace rods 18 as shown. Carried by the axle or shaft 14 and arranged at one side of the frame is a segment 19 having a notch 20 to receive a lug 21 projecting laterally from a latch bolt 22 utilized to normally hold the shoe in the position shown in Figure 1. The bolt 22 slides in a suitable guide 23 supported by one of the side members of the frame, and is normally influenced by a spring 24 which holds the bolt arranged with the lug positioned within the notch of the segment. This bolt is provided with a pin 25 which operates in a slot 26 formed in the guide for said bolt, and the pin 25 is connected with the lever 27 fulcrumed upon the guide as at 28. So, when the lever is moved in one direction against the tension of the spring referred to, the bolt is retracted moving the lug carried thereby out of the notch formed in the segment, thereby releasing the axle or shaft 14 to permit the latter to rotate and present the arcuate shaped shoe to the ground for use. As the shoe is moved into contacting engagement with the ground, the lugs 16 carried by the shoe embed themselves in the ground to obtain an effective purchase, and as the shoe continues to rotate it elevates the harrow from the ground so that it can be cleaned or dumped as above stated. The movement of the harrow assists in forcing the shoe to continue its rotary motion, although this is primarily accomplished through the instrumentality of a spring actuated rod to be hereinafter described.

When the shoe has made a complete revolution, the lug carried by the latch bolt is automatically repositioned in the notch of the segment and thereby locks it against movement until the lever is again operated to effect a release of the same.

The operating rod for the shoe is indicated at 29 and is mounted to slide through a suitable guide 30 carried by the adjacent side member of the frame. Surrounding this rod 29 is a spring 31 of the desired strength to cause the shoe to rotate in the manner above described when released from the latch bolt. The rod 29 is eccentrically connected with the segment as shown, and initially puts the shoe in operation when the latter is released. This spring however only draws the shoe downwardly into engagement with the ground, and as the harrow continues to move forwardly, the shoe which grips the ground is of course further rotated, thereby compressing the spring 31 until the shoe has passed beyond the center, whereby the spring is again called into use for the purpose of returning the shoe into normal position at which time the latch bolt is automatically moved into proper association therewith, in the manner above described to hold the shoe in this position. The attachment is very efficient in operation, and its use makes it possible for the operator to elevate the harrow at any time with a minimum of effort by simply operating the hand lever, which is arranged within convenient reach of the operator whether he be walking behind the harrow or occupying a seat with which the harrow is provided in instances where the harrow is drawn by a tractor.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A harrow attachment of the character described comprising a frame adapted to be attached to the harrow, a shaft mounted for rotation thereon, an arcuate shaped shoe carried by the shaft and normally spaced from the ground, lugs projecting from the shoe and adapted to embed themselves in the ground as the shoe is rotated, means for automatically moving the shoe into contacting engagement with the ground, and subsequently forcing a continued rotation of the shoe as it passes the center, a segment carried by the shaft and having a notch, a latch bolt mounted for sliding movement upon the frame and designed to be received by said notch to hold the shoe in its normal position, and manually operable lever associated with said bolt to effect a release of the shoe when its use is desired.

2. The combination with a harrow, of a frame attached thereto and extending rearwardly therefrom, a rock shaft journaled in the frame, an arcuate shoe fixed to the rock shaft, means normally urging the rock shaft in a direction to dispose the arcuate shoe beneath the frame whereby to elevate the same together with the harrow, and means for normally holding the shoe in inoperative position.

3. An elevating attachment for harrows comprising a frame adapted to be rigidly attached to a harrow, an arcuate shoe having one end rotatably supported in the frame, resilient means normally urging the shoe to a position beneath one end of the frame whereby to elevate the same together with the harrow, and manually operable means connected with the shoe whereby to normally hold the latter in inoperative position.

In testimony whereof I affix my signature.

GEORGE B. UNDERWOOD.